US000001169H

United States Statutory Invention Registration [19]

[11] Reg. Number: H1169

Machado [43] Published: Apr. 6, 1993

[54] POLYMER WITH IMPROVED BARRIER PROPERTIES

[75] Inventor: Joseph M. Machado, Richmond, Tex.

[73] Assignee: Shell Oil Company, Houston, Tex.

[21] Appl. No.: 748,403

[22] Filed: Aug. 22, 1991

[51] Int. Cl.[5] ..... C08F 283/00
[52] U.S. Cl. ..... 525/185; 525/539
[58] Field of Search ..... 525/185, 539

[56] References Cited

U.S. PATENT DOCUMENTS

| | | | |
|---|---|---|---|
| 2,435,537 | 4/1944 | Ford et al. | 260/92.5 |
| 2,495,286 | 1/1950 | Brubaker | 260/63 |
| 3,031,437 | 4/1962 | Iserson | 260/87.7 |
| 3,694,412 | 9/1972 | Nozaki | 260/63 |
| 3,908,070 | 9/1975 | Marzolf | 428/421 |
| 4,818,786 | 4/1989 | Gergen et al. | 525/55 |
| 4,843,144 | 6/1989 | Van Broekhoven et al. | 528/392 |
| 4,866,122 | 9/1989 | Gerlowski et al. | 525/56 |
| 4,877,821 | 10/1989 | Hall et al. | 525/57 |
| 4,879,358 | 11/1989 | Kastelic | 525/539 |
| 4,880,903 | 11/1989 | Van Broekhoven et al. | 528/392 |

FOREIGN PATENT DOCUMENTS 1081304 2/1967 United Kingdom .

*Primary Examiner*—Robert L. Stoll
*Assistant Examiner*—Joseph D. Anthony

[57] ABSTRACT

Polymer compositions comprising an intimate mixture of a linear alternating polymer of carbon monoxide and at least one ethylenically unsaturated hydrocarbon and a poly(vinylidene fluoride) exhibit improved barrier properties. The poly(vinylidene fluoride) is also useful in a method of reducing the water vapor transmission rate of a linear alternating polymer of carbon monoxide and at least one ethylenically unsaturated hydrocarbon.

10 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

POLYMER WITH IMPROVED BARRIER PROPERTIES

FIELD OF THE INVENTION

This invention relates to polyketone polymers, and, more particularly, to compositions of a polyketone polymer blended with a poly(vinylidene fluoride) which exhibit improved barrier properties.

BACKGROUND OF THE INVENTION

The class of polymers of carbon monoxide and olefins has been known for some time. U.S. Pat. No. 2,495,286 (Brubaker) discloses such polymers of relatively low carbon monoxide content produced in the presence of free radical initiators, e.g., peroxy compounds. G.B. 1,081,304 discloses similar polymers of higher carbon monoxide content produced in the presence of alkylphosphine complexes of palladium compounds as catalyst. U.S. Pat. No. 3,694,412 (Nozaki) extended the reaction to produce linear alternating polymers in the presence of arylphosphine complexes of palladium moieties and certain inert solvents.

More recently, the class of linear alternating polymers of carbon monoxide and at least one ethylenically unsaturated hydrocarbon, now becoming known as polyketones or polyketone polymers, has become of greater interest. U.S. Pat. No. 4,880,903 (VanBroekhoven et al.) discloses a linear alternating polyketone terpolymer of carbon monoxide, ethylene, and other olefinically unsaturated hydrocarbons, such as propylene. Processes for production of the polyketone polymers typically involve the use of a catalyst composition formed from a compound of a Group VIII metal selected from palladium, cobalt or nickel, the anion of a strong non-hydrohalogenic acid and a bidentate ligand of phosphorus, arsenic or antimony. U.S. Pat. No. 4,843,144 (VanBroekhoven et al.) discloses a process for preparing polymers of carbon monoxide and at least one ethylenically unsaturated hydrocarbon using a catalyst comprising a compound of palladium, the anion of a non-hydrohalogenic acid having a pKa of below about 6, and a bidentate ligand of phosphorus.

The resulting polymers are relatively high molecular weight materials having utility as thermoplastics in the production of shaped articles, such as containers for food and beverages and film for packaging. In order to improve the utility of such shaped articles, it would be desirable to improve the barrier properties of the polyketone polymers.

SUMMARY OF THE INVENTION

The present invention provides a method for improving the barrier properties of linear alternating polymers of carbon monoxide and at least one ethylenically unsaturated hydrocarbon (i.e. polyketone polymers) by incorporating therein a poly(vinylidene fluoride) polymer. The resulting blends demonstrate reduced permeability to water vapor. The present invention also provides shaped articles, such as containers and films, manufactured from a blend of a polyketone polymer and a poly(vinylidene fluoride)polymer.

DESCRIPTION OF THE INVENTION

It is an object of this invention to improve the barrier properties of polyketone polymers to enhance their utility for packaging food and other materials. This object is realized by adding a blend component with barrier properties better than those of a polyketone polymer to the polyketone polymer. Other objects will be apparent from the description of the invention.

U.S. Pat. No. 4,818,786 (Gergen et al.) discloses that the addition of a poly(vinylidene fluoride) to a polyketone polymer results in an immiscible blend of useful properties. Such blends exhibit a favorable degree of compatibility between the two blend components, and demonstrate good mechanical properties.

It has now been found that these blends exhibit good barrier properties, and provide a method for improving the barrier properties of a polyketone polymer while maintaining other important properties, notably stiffness, strength, and toughness.

The polyketone polymers of the invention are of a linear alternating structure and contain substantially one molecule of carbon monoxide for each molecule of unsaturated hydrocarbon. Suitable ethylenically unsaturated hydrocarbons for use as precursors of the polyketone polymers have up to 20 carbon atoms inclusive, preferably up to 10 carbon atoms, and are aliphatic such as ethylene and other $\alpha$-olefins including propylene, 1-butene, isobutylene, 1-hexene, 1-octene and 1-dodecene, or are arylaliphatic containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstyrene. The preferred polyketone polymers are copolymers of carbon monoxide and ethylene or terpolymers of carbon monoxide, ethylene and a second ethylenically unsaturated hydrocarbon of at least 3 carbon atoms, particularly an $\alpha$-olefin such as propylene.

When the preferred polyketone terpolymers are employed as the major polymeric component of the blends of the invention, there will be within the terpolymer at least about 2 units incorporating a moiety of ethylene for each unit incorporating a moiety of the second hydrocarbon. Preferably, there will be from about 10 units to about 100 units incorporating a moiety of ethylene for each unit incorporating a moiety of the second hydrocarbon. The polymer chain of the preferred polyketone polymers is therefore represented by the repeating formula $$\left[CO\left(CH_2-CH_2\right)\right]_x\left[CO\left(G\right)\right]_y$$

wherein G is the moiety of ethylenically unsaturated hydrocarbon of at least 3 carbon atoms polymerized through the ethylenic unsaturation and the ratio of y:x is no more than about 0.5. When copolymers of carbon monoxide and ethylene are employed in the blends of the invention, there will be no second hydrocarbon present and the copolymers are represented by the above formula wherein y is zero. When y is other than zero, i.e. terpolymers are employed, the $-CO(CH_2CH_2)-$ units and the $-CO(G)-$ units are found randomly throughout the polymer chain, and preferred ratios of y:x are from about 0.01 to about 0.1. The end groups or "caps" of the polymer chain will depend upon what materials were present during the production of the polymer and whether or how the polymer was purified. The precise nature of the end groups does not appear to influence the properties of the polymer to any considerable extent so that the polymers are fairly represented by the formula for the polymer chain as depicted above.

Of particular interest are the polyketone polymers of number average molecular weight from about 1000 to about 200,000, particularly those of number average molecular weight from about 20,000 to about 90,000 as determined by gel permeation chromatography. The physical properties of the polymer will depend in part upon the molecular weight, whether the polymer is a copolymer or a terpolymer and, in the case of terpolymers, the nature and proportion of the second hydrocarbon present. Typical melting points for the polymers are from about 175° C. to about 300° C., more typically from about 210° C. to about 270° C. The polymers have a limiting viscosity number (LVN), measured in m-cresol at 60° C. in a standard capillary viscosity measuring device, from about 0.5 dl/g to about 10 dl/g, more frequently from about 0.8 dl/g to about 4 dl/g.

A preferred method for the production of the polyketone polymers is illustrated by U.S. Pat. No. 4,843,144 (Van Broekhoven et al.). The carbon monoxide and hydrocarbon monomer(s) are contacted under polymerization conditions in the presence of a catalyst composition formed from a compound of palladium, the anion of a non-hydrohalogenic acid having a pKa (measured in water at 18° C.) of below about 6, preferably below 2, and a bidentate ligand of phosphorus. The scope of the polymerization is extensive but, without wishing to be limited, a preferred palladium compound is a palladium carboxylate, particularly palladium acetate, a preferred anion is the anion of trifluoroacetic acid or p-toluenesulfonic acid and a preferred bidentate ligand of phosphorus is 1,3-bis(diphenylphosphino)propane or 1,3-bis[-di(2-methoxyphenyl)phosphino]propane.

The polymerization to produce the polyketone polymer is conducted in an inert reaction diluent, preferably an alkanolic diluent, and methanol is preferred. The reactants, catalyst composition and reaction diluent are contacted by conventional methods such as shaking, stirring or refluxing in a suitable reaction vessel. Typical polymerization conditions include a reaction temperature from about 20° C. to about 150° C., preferably from about 50° C. to about 135° C. The reaction pressure is suitable from about 1 atmosphere to about 200 atmospheres but pressures from about 10 atmospheres to about 100 atmospheres are preferred. Subsequent to polymerization, the reaction is terminated as by cooling the reactor and contents and releasing the pressure. The polyketone polymer is typically obtained as a product substantially insoluble in the reaction diluent and the product is recovered by conventional methods such as filtration or decantation. The polyketone polymer is used as recovered or the polymer is purified as by contact with a solvent or extraction agent which is selective for catalyst residues.

The polymer utilized to improve the barrier properties of the polyketone polymers is a poly(vinylidene fluoride) polymer. By poly(vinylidene fluoride) polymer is meant a polymer wherein at least a considerable predominance of the monomer units present is vinylidene fluoride, represented by the formula $CH_2{=}CF_2$. In preferred modifications the polyvinylidene polymer is a homopolymer of vinylidene fluoride. In other modifications, copolymers of at least 90% by mole of vinylidene fluoride are suitable, with any remainder being other fluorinated monomeric moieties containing fluorine, such as tetrafluoroethylene, hexafluoropropylene or vinyl fluoride. Such polyvinylidene fluoride polymers are well known in the art and are produced, for example, by conventional methods such as those described in U.S. Pat. No. 2,435,537 (Ford et al.) and U.S. Pat. No. 3,031,437 (Iserson). The poly(vinylidene fluoride) polymers are thermoplastic in character, having softening temperatures on the order of 145° C., and are conventionally used in films and coatings. Such polymers are commercially available, e.g. Atochem KYNAR® 201.

The method of the invention comprises incorporating into a polyketone polymer an amount of the poly(vinylidene fluoride) polymer effective to improve the barrier properties of the polyketone polymer. The specific amount of poly(vinylidene fluoride) and the relative proportions of the two components of the blend is not critical, as long as an effective amount is present and other important polymer properties for the intended use are not adversely affected. The poly(vinylidene fluoride) is provided in an amount from about 10 wt. % to about 45 wt. % poly(vinylidene fluoride), based on the total weight of polymer. Compositions containing from about 25 wt. % to about 45 wt. % poly(vinylidene fluoride), on the same basis, are believed to exhibit desirable barrier properties, while compositions containing from about 35 wt. % to about 45 wt. % poly(vinylidene fluoride) are preferred for a wide variety of packaging applications.

The polyketone/poly(vinylidene fluoride) polymer blend is a non-miscible blend, with the poly(vinylidene fluoride) polymer existing as a discrete phase in the polyketone matrix with a phase size on the order of from about 0.8 micron to about 2.2 microns, more often on the order of from about 1.2 micron to about 1.6 micron. The blends will not be homogeneous, but satisfactory blends are obtained when the poly(vinylidene fluoride) is uniformly distributed throughout the polyketone matrix. While not wishing to be bound by any particular theory, it is speculated that compatibility of the polyketone/poly(vinylidene fluoride) blends is due to hydrogen bonding of the ketones on the polyketone polymer with the methylene hydrogens of the poly(vinylidene fluoride) polymer in the vicinity of the interface of the component domains.

The poly(vinylidene fluoride) is added to the polyketone polymer by any method suitable for forming an intimate mixture of the two polymers. Such methods include dry blending of the polymers in a finely divided form, followed by injection molding or extrusion of the mixture using single or twin screw extruders. The composition may also be produced by blending the components in a melt mixing device. In general, subjecting the melt mixture to a high shear field for some period is necessary to generate the desired dispersion.

The compositions of the invention may also include other additives such as antioxidants, dyes, fillers or reinforcing agents, fire resistant materials, mold release agents, colorants and other materials designed to improve the processability of the polymers or the properties of the resulting blend. Such additives are added prior to, together with, or subsequent to the blending of the polyketone and poly(vinylidene fluoride).

The compositions are processed by methods such as extrusion and injection molding into sheets, films, plates, containers and other shaped articles. Illustrative of desirable applications are the production of articles useful in both rigid and flexible packaging applications for food, beverages, and other materials.

The invention is further illustrated by the following Examples which should not be regarded as limiting.

EXAMPLE 1

A linear alternating terpolymer of carbon monoxide, ethylene, and propylene (P-1000/2) was produced in the presence of a catalyst composition formed from palladium acetate, trifluoroacetic acid and 1,3-bis[di(2-methoxyphenyl)phosphino]propane. The polyketone polymer had a melting point of about 220° C. and an LVN of about 1.8 dl/g when measured in m-cresol at 60° C. The polyketone polymer also contained 0.5% Ethanox 330 and 0.5% Nucrel 535.

EXAMPLE 2

Blends were prepared of the polyketone terpolymer of Example 1 and an extrusion grade poly(vinylidene fluoride), KYNAR 201, available from Atochem Corporation. The blends were compounded using a Haake 30 mm co-rotating twin screw extruder operating at 250° C. and 200 rpm, and subsequently injection molded using an Arburg Allrounder. Molded specimens were used for mechanical testing.

The mechanical properties of the polyketone/poly(-vinylidene fluoride) blends are summarized in Table 1. The strength and stiffness of the polyketone matrix are almost fully maintained upon blending with up to 40 wt. % poly(vinylidene fluoride). The blends also maintain a high level of ductility and toughness, as indicated by elongations at break greater than 200%, and notched Izod impact values greater than 3.0 ft-lb/in.

The permeability properties of the blends are also summarized in Table 1. A Mocon cell using a modulated infrared sensor (ASTM F 1249) was used to determine the permeability to water vapor at 100° F. and 90% relative humidity for compression molded plaques that were 30 mils thick. The permeability decreased approximately linearly with increasing proportion of poly(vinylidene fluoride).

TABLE 1

| Tensile, Impact, and Permeability Properties | | | | | | | |
|---|---|---|---|---|---|---|---|
| Composition (Polyketone/ PVF) | Flexural Modulus (PSI) | Flexural Strength (PSI) | Tensile Strength (PSI) | Elongation at Break (%) | Notched Izod @ RT (ft-lb/in) | Gardner Impact @ −30° C. (in-lb) | Permeability (cc-mil/100 in$^2$-day) |
| 100/0 | 251,000 | 8690 | 8590 | 200 | 4.1 | 64 | 13.6 |
| 90/10 | 255,00 | 8840 | 8560 | 260 | 3.5 | 28 | 11.9 |
| 80/20 | 248,000 | 8720 | 8170 | 230 | 3.1 | 37 | 11.0 |
| 70/30 | 249,000 | 8950 | 8040 | 310 | 3.3 | 24 | 9.35 |
| 60/40 | 254,000 | 9020 | 7990 | 360 | 3.2 | 18 | 8.5 |
| 0/100 | — | — | 6350 | 70 | 2.5 | — | 4.9* |

*Published data.

EXAMPLE 3

A linear alternating terpolymer of carbon monoxide, ethylene, and propylene (89/054) was produced in the presence of a catalyst composition formed from palladium acetate, trifluoroacetic acid and 1,3-bis[di(2-methoxyphenyl)phosphino]propane. The polyketone polymer had a melting point of about 220° C. and an LVN of about 1.1 dl/g when measured in m-cresol at 60° C. The polyketone polymer also contained 0.5% Ethanox 330 and 0.5% Nucrel 535.

EXAMPLE 4

Blends were prepared of the polyketone terpolymer of Example 3 and the poly(vinylidene fluoride) of Example 2. The blends were compounded using a Haake 30 mm co-rotating twin screw extruder operating at 250° C. and 200 RPM, and subsequently injection molded into 7.5 oz. cups using a Krauss-Maffei 100-ton injection molding machine. The cups had an average wall thickness of about 27 mils.

The cups were filled with water, double seamed with an aluminum lid, maintained in a 50% relative humidity environment, and weighed periodically to determine water loss over time. Some of the samples were also subjected to a retort cycle in a Barnstead benchtop sterilization unit with 15 psi overpressure. The retort temperature was increased until the internal temperature reached 260° F., at which point the container was slowly cooled to 150° F. The total cycle required about three hours.

The water vapor transmission rates for these containers are shown in Table 2. The rate of weight loss decreased approximately linearly with increasing proportion of poly(vinylidene fluoride). In all cases, the containers subjected to a retort cycle demonstrated about 40% increase in the rate of water loss through the container, relative to the samples not subjected to the retort cycle. The fact that the blends did not experience a greater increase in water transport rate than the unblended polyketone control as a result of retort "shock" is additional evidence of good blend compatibility. The cups which were molded from the blends of this example maintained an excellent appearance, as evidenced particularly by a lack of splay, delamination, or surface blemishes.

TABLE 2

| Water Vapor Transmission Rate for Thin-Wall Containers | | |
|---|---|---|
| Composition (Polyketone/ PVF) | Water Vapor Transmission Rate (% weight loss per year) | |
| | Without Retort | After Retort |
| 100/0 | 5.56 | 7.97 |
| 80/20 | 4.19 | 6.03 |
| 60/40 | 3.11 | 4.32 |

The examples above demonstrate that poly(vinylidene fluoride)may be used to improve the barrier properties of a polyketone polymer.

What is claimed is:

1. A method for improving barrier properties of a linear alternating polymer of carbon monoxide and at least one ethylenically unsaturated hydrocarbon by incorporating therein an amount of a poly(vinylidene fluoride) polymer sufficient to reduce the barrier property water vapor transmission rate of the linear alternating polymer to less than about 5 wt. % loss per year.

2. The method of claim 1 wherein the polymer is of the repeating formula $$\left[CO\left(CH_2-CH_2\right)\right]_x\left[CO\left(G\right)\right]_y$$

wherein G is a moiety of an ethylenically unsaturated hydrocarbon of at least 3 carbon atoms polymerized through the ethylenic unsaturation, and the ratio of y:x is no more than about 0.5.

3. The method of claim 1 wherein y is 0.

4. The method of claim 1 wherein the ratio of y:x is from about 0.01 to about 0.1.

5. The method of claim 4 wherein G is a moiety of propylene.

6. A method of reducing a water vapor permeability rate of a linear alternating polymer of carbon monoxide and at least one ethylenically unsaturated hydrocarbon by incorporating therein an amount of a poly(vinylidene fluoride) sufficient to reduce the water vapor permeability rate of the linear alternating polymer to about 10 cc-mil/100 $in^2$-day or less.

7. The method of claim 6 wherein the polymer is of the repeating formula $$\left[CO\left(CH_2-CH_2\right)\right]_x\left[CO\left(G\right)\right]_y$$

wherein G is a moiety of an ethylenically unsaturated hydrocarbon of at least 3 carbon atoms, polymerized through the ethylenic unsaturation, and the ratio of y:x is no more than about 0.5.

8. The method of claim 7 wherein y is 0.

9. The method of claim 7 wherein the ratio of y:x is from 0.01 to about 0.1.

10. The method of claim 9 wherein G is a moiety of propylene.

* * * * *